US008788172B2

(12) United States Patent
Böhm et al.

(10) Patent No.: US 8,788,172 B2
(45) Date of Patent: Jul. 22, 2014

(54) METHOD AND DEVICE FOR CONTROLLING AN ELECTROHYDRAULIC BRAKING SYSTEM FOR MOTOR VEHICLES (75) Inventors: Jurgen Böhm, Oberneisen (DE); Georg Roll, Heusenstamm (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 13/703,154

(22) PCT Filed: May 31, 2011

(86) PCT No.: PCT/EP2011/058870
§ 371 (c)(1),
(2), (4) Date: Dec. 10, 2012

(87) PCT Pub. No.: WO2011/154275
PCT Pub. Date: Dec. 15, 2011

(65) Prior Publication Data
US 2013/0080016 A1    Mar. 28, 2013

(30) Foreign Application Priority Data

Jun. 10, 2010   (DE) .......................... 10 2010 029 901
Jun. 10, 2010   (DE) .......................... 10 2010 029 902
May 30, 2011   (DE) .......................... 10 2011 076 675

(51) Int. Cl.
| B60T 7/12 | (2006.01) |
| B60T 7/04 | (2006.01) |
| B60T 13/68 | (2006.01) |
| B60T 13/74 | (2006.01) |
| B60T 13/66 | (2006.01) |
| B60T 8/32 | (2006.01) |
| B60T 8/176 | (2006.01) |

(52) U.S. Cl.
CPC ................ *B60T 8/176* (2013.01); *B60T 7/042* (2013.01); *B60T 2270/82* (2013.01); *B60T 13/686* (2013.01); *B60T 13/745* (2013.01); *B60T 13/662* (2013.01); *B60T 8/326* (2013.01)
USPC .......................................................... 701/78

(58) Field of Classification Search
CPC ................................. B60T 13/74; B60T 7/042
USPC .......................................................... 701/78
See application file for complete search history.

(56) References Cited

U.S. PATENT DOCUMENTS

2003/0020327 A1    1/2003   Isono et al.
2003/0160503 A1*  8/2003   Riddiford et al. ................. 303/3

(Continued)

FOREIGN PATENT DOCUMENTS

DE   195 02 925 A1   1/1996
DE   195 38 794 A1   4/1997

(Continued)

OTHER PUBLICATIONS

German Examination Report—Nov. 4, 2011.

(Continued)

*Primary Examiner* — James Trammell
*Assistant Examiner* — Michael D Lang
(74) *Attorney, Agent, or Firm* — Brinks Gilson & Lione (57) ABSTRACT A method for controlling an electro-hydraulic braking system for motor vehicles, including providing an antilock control function, and a further brake pressure control function which can be activated in a "brake-by-wire" mode. A pressurization device, activated by an electronic control unit can be connected to hydraulically actuated wheel brakes through at least one pressure regulating valve. The pressurization device having a cylinder-piston arrangement with a chamber, the piston of which can be displaced relative to a rest position by an electromechanical actuator. A set pressure value is determined for each wheel brake activating the cylinder-piston arrangement such that a predetermined pre-pressure, which is determined from the set pressure values, is set in the chamber by displacement of the piston.

19 Claims, 5 Drawing Sheets (56) References Cited

U.S. PATENT DOCUMENTS

2006/0082217 A1 4/2006 Hatano et al.
2009/0115247 A1* 5/2009 Leiber et al. .................. 303/154

FOREIGN PATENT DOCUMENTS

| DE | 102 33 196 A1 | 2/2003 |
| DE | 10 2009 008 944 A1 | 8/2010 |
| DE | 10 2010 002 406 A1 | 9/2011 |
| FR | 2 924 082 | 11/2007 |
| WO | WO 2006/111393 A1 | 10/2006 |
| WO | WO 2008/025797 A1 | 3/2008 |

OTHER PUBLICATIONS

PCT International Search Report—Sep. 14, 2011.

* cited by examiner

METHOD AND DEVICE FOR CONTROLLING AN ELECTROHYDRAULIC BRAKING SYSTEM FOR MOTOR VEHICLES

CROSS-REFERENCE TO RELATED APPLICATIONS

This application Claims priority to German Patent Application Nos. 10 2010 029 901.4, filed Jun. 10, 2010, 10 2010 029 902.2, filed Jun. 10, 2010, 10 2011 076 675.8, filed May 30, 2011 and PCT/EP2011/058870, filed May 31, 2011.

FIELD OF THE INVENTION

The invention relates to a method for controlling a braking system for motor vehicles and a device for controlling an electro-hydraulic braking system for motor vehicles.

BACKGROUND OF THE INVENTION

"Brake-by-wire" braking systems are becoming ever more common in automotive engineering. Such braking systems often comprise a pedal decoupling unit, which is connected to a brake master cylinder on the inlet side, so that an actuation of the brake pedal by the driver in the "brake-by-wire" operating mode does not lead to direct actuation of the brake master cylinder by the driver. Instead, in the "brake-by-wire" operating mode the brake master cylinder is actuated by an electrically controllable pressurization device, in other words actuated "separately". In order to give the driver an agreeable pedal feel in the "brake-by-wire" operating mode, the braking systems usually comprise a brake pedal feel simulation device. In these braking systems the brake may also be actuated on the basis of electronic signals without any active involvement on the part of the driver. These electronic signals may be delivered, for example, by an electronic stability program ESC or a distance control system ACC.

The international patent application WO 2008/025797 A1 discloses such a braking system. In order to be able to dispense with an elaborate and inefficient intermediate storage of hydraulic servo energy, it is proposed that the fluid needed for electrical control of the input pressure in an intermediate chamber used for actuation of the brake master cylinder be held ready at zero pressure in the pressurization device and subjected to a higher pressure as required. The pressurization device used for this purpose is formed by a cylinder-piston arrangement, for example, the piston of which can be actuated by an electromechanical actuator. A method for controlling the braking system, in particular the pressurization device, is not described.

The object of the present invention, therefore, is to provide a method for controlling an electro-hydraulic "brake-by-wire" braking system having an electrically controllable pressurization device, having a cylinder-piston arrangement, the piston of which can be actuated by an electromechanical actuator, the method affording a considerable improvement of the pressurization device functions.

According to the invention this object is achieved by a method as and a device in accordance with this invention.

A closed or open-loop brake pressure control function is preferably taken to mean an antilock control (ABS), a traction or wheel slip control (TCS, ASR), an electronic stability program (ESP, ESC, yaw moment control) or a driver assist function such as, for example, ACC, HSA, HDC etc.

The method according to the invention is advantageously performed in a braking system for motor vehicles, which in a so-called "brake-by-wire" operating mode can be activated both by the driver of the vehicle and also independently of the driver of the vehicle, which is preferably operated in the "brake-by-wire" operating mode and which can be operated in at least one reversion operating mode, in which operation is only possible by the driver.

The wheel brakes are preferably connected to the hydraulic pressure chamber of the cylinder-piston arrangement. An electrically activated inlet valve, which serves for hydraulically isolating the wheel brake from the pressure chamber, is preferably arranged between a wheel brake, in particular each wheel brake, and the pressure chamber. A brake master cylinder, which serves to actuate the cylinder-piston arrangement, is advantageously arranged between the pressure chamber of the cylinder-piston arrangement and the inlet valve(s).

A wheel brake, in particular each wheel brake, can preferably be connected to a brake fluid reservoir via an electrically activated outlet valve.

It is likewise preferred that the hydraulic pressure chamber of the cylinder-piston arrangement be connectable to a brake fluid reservoir via an electrically activated valve.

The braking system preferably comprises a brake master cylinder, which can be actuated by means of the electrically controllable pressurization device and to which wheel brake circuits are connected, and a hydraulic pedal decoupling unit arranged between a brake pedal and the brake master cylinder.

BRIEF DESCRIPTION OF THE FIGURES

Further preferred embodiments of the invention emerge from the following description, referring to schematic figures, of which.

DETAILED DESCRIPTION OF THE INVENTION

The control concept described herein describes the setting of suitable pre-pressure characteristic curves in a pressure chamber of the electro-hydraulic pressurization device of an active braking system, in particular the setting of a suitable pre-pressure value by means of the electric motor-driven piston of the pressurization device in an active braking system, taking into account closed and open-loop brake pressure control functions on individual wheels.

Figure 1:
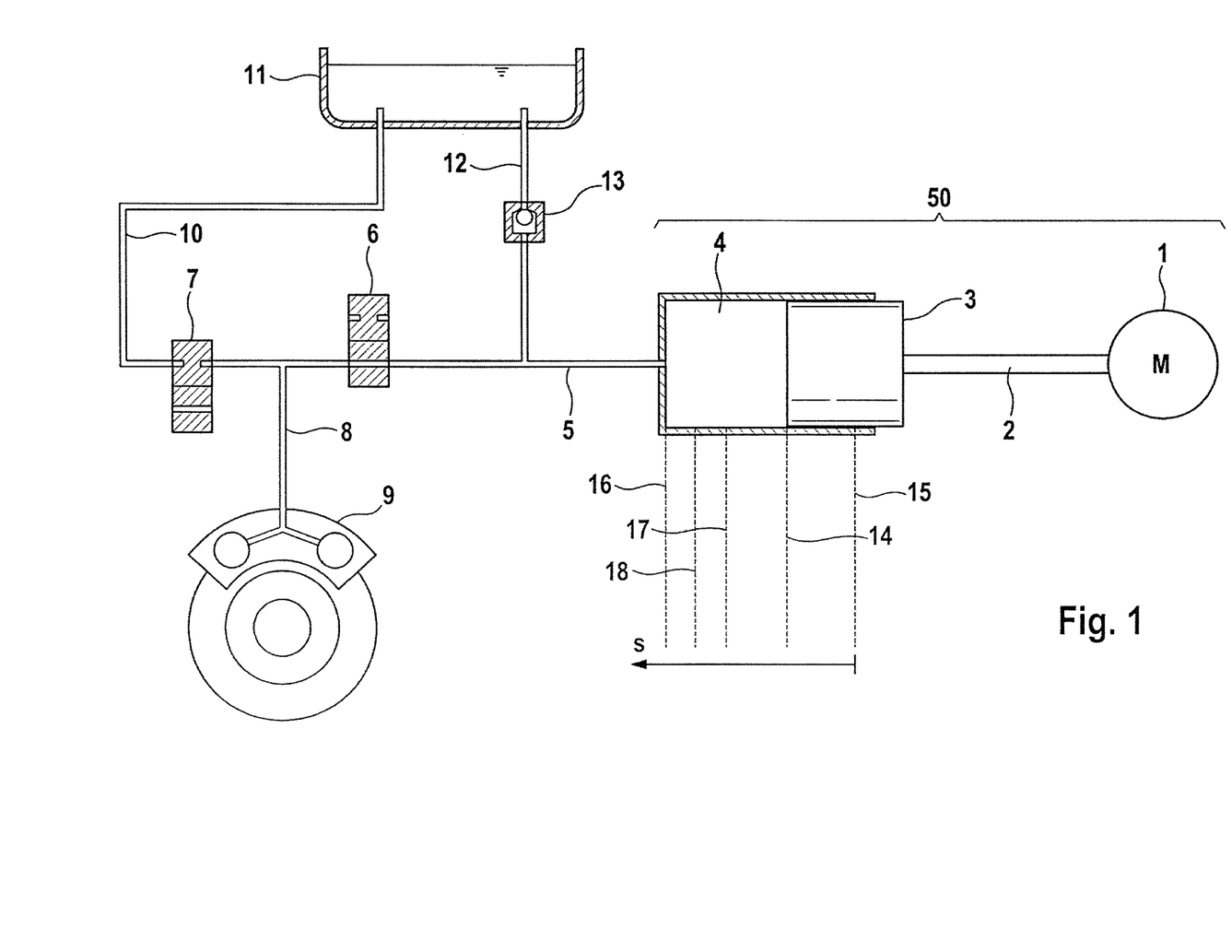
FIG. 1 shows a schematic circuit diagram of an electrohydraulic braking system for performing a method according to the invention.

FIG. 1 shows the simplified principle of an active braking system for a controlled wheel of a hydraulically braked vehicle. A method according to the invention is preferably performed in an (active) braking system, in which the driver, for example by means of a brake pedal travel, makes a pressure request and this is electronically translated by means of a pressurization device comprising, for example, an electric motor or actuator 1, a suitable transmission 2 and a piston 3 in a hydraulic pressure chamber 4, in that the piston 3 travels by a distance s out of a rest position 15 into a position 14, so that a specific volume of the brake fluid is displaced from the pressure chamber 4 via the line 5 and an initially opened inlet valve 6 into the brake line 8 and consequently into the wheel brake 9. A brake pressure is thereby generated in the wheel brake 9. The brake pressure can be reduced by the piston 3 running back towards the rest position 15 again. A rapid reduction in brake pressure, as is necessary in the case of an ABS control, for example, is also possible by means of the valve combination 6, 7 by closing the inlet valve 6 and opening the outlet valve 7 for a specific time. Brake fluid then flows out of the wheel brake 9 via the line 8 through the outlet valve 7 and consequently via the line 10 into the brake fluid reservoir 11. This pressure reduction measure is particularly advisable where the pressure chamber 4 serves multiple wheel brakes in parallel.

In principle the braking system represented in FIG. 1 can be expanded by any number of wheel brakes 9 by leading more lines 5 to the wheel circuits, each wheel circuit preferably having an individual pair of valves 6, 7.

In order to form a multi-circuit system for safety reasons, multiple pistons 3 and multiple pressure chambers 4 may be provided. For automobiles a dual circuit is advisable, each two wheel brakes being connected to either of two pressure chambers.

Numerous enhancements compared to the simplified representation of the system in FIG. 1 and various embodiments of the principle are feasible, for example in the choice of valves. A brake master cylinder, for example, may also be arranged between the hydraulic pressure chamber 4 and the wheel brake(s) 9, so that the pressure generated in the pressure chamber 4 is delivered to an intermediate hydraulic chamber, for example in an actuating device, which serves to actuate the brake master cylinder.

The invention is concerned with the problem of setting suitable pre-pressures in the pressure chamber 4.

The need for a pre-pressure arises whenever the driver, by means of the brake pedal, requests a general brake pressure for all wheels of the motor vehicle, or when this pressure request is made by an assist function ACC (adaptive cruise control), HSA (hill start assist), HDC (hill descent control) etc., or when a special brake control function is active on individual wheels, such as ABS (antilock braking system), TCS (traction control system) or ESP (electronic stability program), for example.

The assist functions generally require a global brake pressure for all wheels, in a manner similar to the driver in basic braking initiated by the brake pedal. In these cases the pressure with the inlet valve 6 opened is generated equally on all brake circuits by advancing of the piston.

The antilock braking function (ABS) generally limits or reduces only the pressure applied by the pressure chamber 4 for individual wheels, in order keep these within a desired optimum wheel slip.

In the case of traction control (TCS), individual wheels which have a tendency to spin due to an excessive drive torque are specifically braked. To do this, the system must generate an active pressure in the pressure chamber 4, which has not been requested by the driver. The pressure from the pressure chamber 4 must then be fed individually via the valves 6, 7 into the wheel brake 9 of the wheel to be braked, whilst the brake circuits of the other wheels, which remain uncontrolled, are isolated from the pressure chamber 4 by means of the inlet valves. This applies similarly to the electronic stability program (ESP). Here brake pressures are likewise applied actively and selectively to individual wheels, in order to influence the dynamics of the vehicle about the vertical axis.

In all cases the pre-pressure of the pressure chamber 4 is advantageously to be set so that the wheel with the highest brake pressure request can be reliably supplied with the necessary pressure. On a wheel that needs less pressure than is generated in the pressure chamber 4, the pressure must be limited in that the inlet valve 6 associated with the wheel is lastingly or temporarily closed. Should the wheel then need a lower pressure than that already set and the pre-pressure is higher than the desired wheel pressure, brake fluid must be discharged from the wheel brake 9 into the reservoir 11 by means of the associated outlet valve 7.

For example, the pre-pressure $P_{Pre\_Pressure}$ in the pressure chamber 4 is set according to the following correlation:

$$P_{Pre\_Pressure} = \mathrm{maximum}(P_{Request\_1}, \ldots, P_{Request\_n})$$

where $P_{Request\_i}$ is the pressure request for the i-th wheel, and n is the number of wheels, that is to say the pre-pressure is obtained as the maximum for the pressure requests of the individual wheels.

The individual-wheel pressure request $P_{Request\_j}$ for the i-th wheel is calculated, for example, as follows:

$$P_{Request\_i} = \mathrm{minimum}((P_{ABS\_act\_i} + \Delta P), (\mathrm{maximum}(P_{Request\_Driver\_i}, P_{Request\_Assist\_i}, P_{Request\_TCS\_i}, P_{Request\_ESP\_i})))$$

where $P_{Request\_Driver\_i}$ is the driver request pressure (requested by means of brake pedal actuation), $P_{Request\_Assist\_i}$ is the highest pressure request based on active assist functions (for example from ACC, HSA, HDC etc.), $P_{Request\_TCS\_i}$ is the pressure request by TCS or BTCS (that is to say TCS by means of individual wheel braking), $P_{Request\_ESP\_i}$ is the pressure request by ESP, $P_{ABS\_act\_i}$ is the locking pressure level that was detected during an ABS control on the i-he wheel, or maximum pressure (for example 200 bar), if ABS on the i-th wheel does not have a control priority, $\Delta P$ is an additional amount of pressure (for example 20 bar).

This equation states that in order to determine $P_{Request\_i}$ the maximum request is first formed from the driver braking request, the active braking request of the assist functions and from the active brake pressure request from TCS and ESP. A check is then performed as to whether an ABS control is running on the i-th wheel and also whether it has priority in relation to the other control functions (for example in relation to ESP). In this case the previously determined maximum request is limited to the pressure level that is required for the ABS control, something which is achieved with the aforesaid minimum function. For setting the ABS pressure, a pre-pressure is estimated, which results from the sum of $P_{ABS\_act\_i}$ and $\Delta P$, that is to say the detected locking pressure level and an additional safety allowance $\Delta P$ (for example approximately 20 bar).

The locking pressure level is continuously raised in a transition to higher coefficients of friction by setting it to the wheel pressure attained at any given time.

The additional safety allowance $\Delta P$ in the pre-pressure relative to the wheel pressure is necessary since the ABS function basically sets the wheel pressure by cyclically opening and closing the inlet and outlet valves. A pressure differential $\Delta P$ on the inlet valve is necessary in order to reliably ensure a flow of fluid during timed or partial opening of the valve via an analog flow value.

If ABS is inactive or does not have a control priority on the wheel in question, the maximum pressure of the system, that is to say 200 bar, for example, is assumed as ABS pressure request. The maximum request of all other functions is then selected via the minimum function in the equation above.

Since in the method described above for the reduction of pressure on individual wheels via the pair of valves 6, 7 volumes are discharged from the pressure chamber 4 into the reservoir 11, the piston 3, particularly during ABS braking, will gradually move in the direction of the limit position 16 (limit stop), so that after a few control cycles any further build-up of pressure is no longer possible.

Provision is therefore preferably made to incorporate special cycles during ABS control, in which the piston 3 is run back at a defined but maximum possible actuator speed in the direction of the starting position 15, thereby drawing volumes of fluid out of the reservoir 11 via the line 12 and the non-return valve 13. In order that the piston does not suck the wheel brake 9 dry, the inlet valve 6 of each wheel is closed during the suction cycles. The line 8 is thereby hydraulically isolated and the pressure in the brake 9 remains at a constant level.

On termination of a suction cycle there is again sufficient fluid in the pressure chamber 4, so that the ABS control can be continued with cyclical pressure build-up and reduction phases.

Figure 2:
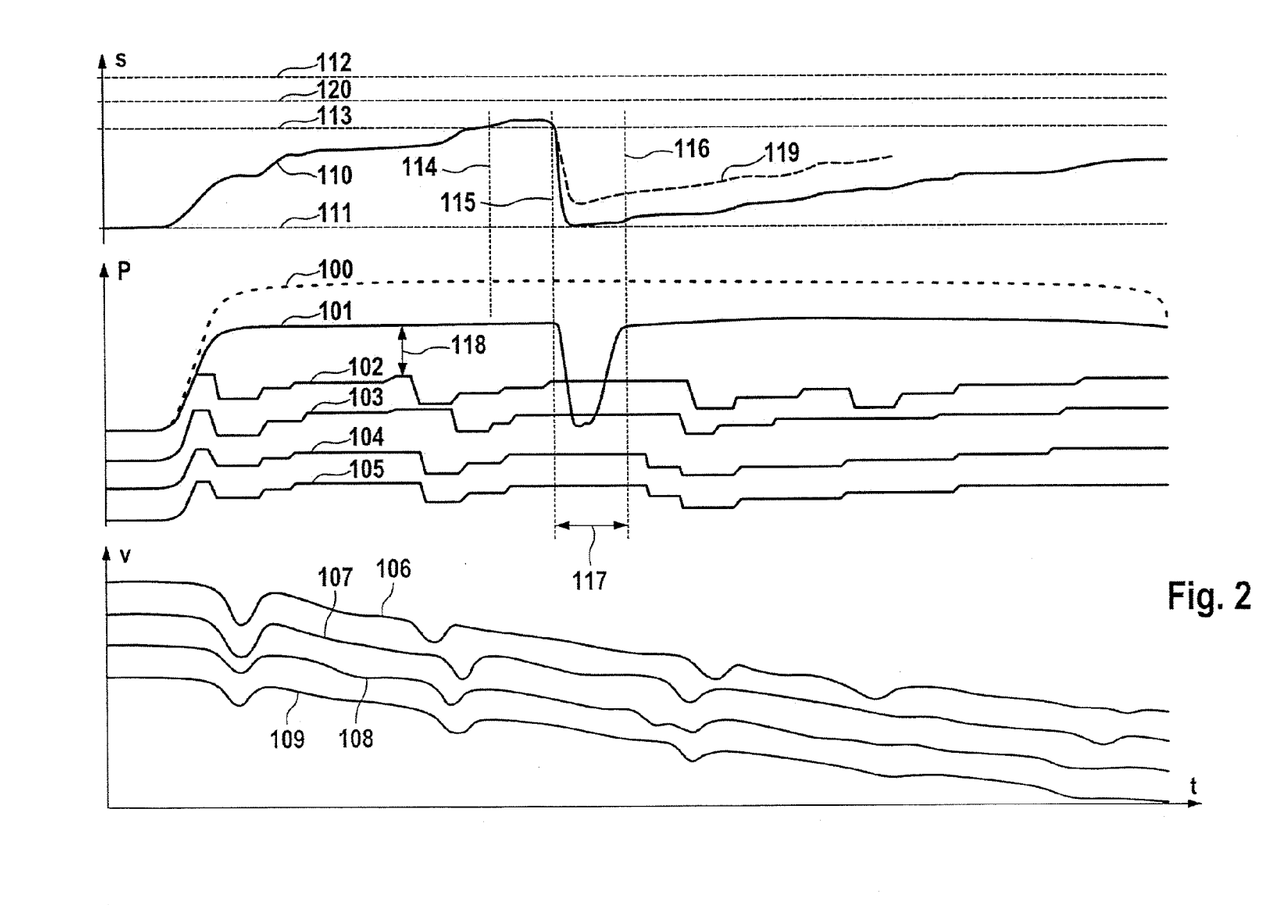
FIG. 2 shows time characteristic curves of variables relevant for the method.

By way of example, FIG. 2 represents a time sequence of the pre-pressure or volume control for the pressure chamber 4 using the example of an ABS control for the four wheel brakes of an automobile. Owing to an excessive brake pedal actuation the driver has requested the high brake pressure characteristic curve 100 (dashed signal). The wheel brake pressures of the four wheel brakes are depicted as characteristic curves 102 to 105 (for greater clarity, in FIG. 2 these are shown offset in relation to one another). From the request 100, the brake control generates the pressure characteristic curve 101 in the pressure chamber 4. Since as a result of this all four wheels are locked, which according to known methods is detected from the wheel speeds 106 to 109 (for greater clarity, in FIG. 2 these are shown offset in relation to one another), the control concept proposed here reduces the pre-pressure in the pressure chamber 4 to the value 101, which is less than the driver request 100. All wheels can thereby be kept lastingly under ABS control, so that the high pre-pressure 100 is not at all necessary.

As already described above, it is advantageously proposed, for example, to select a pre-pressure in the pressure chamber 4 which is only higher by a specific amount 118 (corresponds to the value ΔP in the equation above, that is 20 bar, for example) than the pressure that is requested by the ABS for the wheel having the highest pressure level.

FIG. 2 in the upper part shows the travel s of the piston 3 (signal 110). The travel commences in the rest position 111 (corresponds to the value 15 in FIG. 1) and, owing to the build-up of brake pressure and the incremental volumetric consumption due to opening of the outlet valves 8, in the event of the pressure reduction phases gradually moves in the direction of the limit position 112 (corresponding to the value 16 in FIG. 1).

A suction cycle is started, for example, when the piston 3 goes beyond the critical position 113 (corresponds to the value 17 in FIG. 1), which in FIG. 2 is the case at the time 114. The control then determines when the suction cycle is permitted on the basis of the ABS control situation. This is determined, for example, according to a concept described further below. In the example in FIG. 2, suction might be possible at the time 115. In this example the piston 3 has then been run back completely in the time interval 117, that is to say into the rest position 111, which means that the maximum possible volume is drawn out of the reservoir 11.

According to another exemplary embodiment the piston 3 is not always run back into the rest position 111. It is also possible that it will not always traverse this maximum travel, but where necessary will also draw a smaller volume depending on the control situation, which would lead, for example, to the dashed travel characteristic curve 119.

The piston 3 is then again advanced somewhat, in order to raise the pre-pressure 101 again to the original level necessary for further ABS control. The pre-pressure is reached again at the time 116, so that the ABS control can be continued.

In the time interval 117 the inlet valve 6 on all wheel brake circuits is closed, in order that these retain their pressure levels, although the pre-pressure 101 in the time interval 117 subsides to 0 due to the suction process.

Such a suction cycle may last approximately 100 to 200 ms, according to the volumetric dimensions and engine design. Since no pressure build-up can occur in one of the wheel circuits in this time interval, the times for the suction must be selected so that in the ensuing period from approximately 100 to 200 ms as far as possible the need for a considerable pressure build-up is not anticipated on any wheel. The control concept therefore advantageously proposes that for safety reasons a suction cycle should in any case be activated if the piston position 110 exceeds a high threshold 120 (corresponds to the threshold 18 in FIG. 1).

In the example in FIG. 2, suction is possible from the time 115 onwards, since all four wheels are in a sufficiently long pressure build-up phase, so that the wheel pressure levels are all close to the previously detected locking pressures. Maintaining these pressures over a period of 100 to 200 ms should therefore not lead to under-braking. The thresholds 113 (for conditional suction) and 120 (for unconditional suction) may be firmly preset within the starting position 111 and the limit stop 112.

It is likewise basically possible to run back to the piston starting position 111 in each suction process. It is advantageous, however, for determination of both the triggering thresholds and the stroke of the suction process to be event-controlled, that is to say dynamically controlled during the respective braking control process.

According to a further exemplary embodiment of the invention the thresholds 113 and 120 and the target position for the suction process are selected according to the current vehicle speed. If in full braking a low residual speed is attained, for example, it may be assumed that a large volume is no longer needed for completion of the ABS control. For reasons of comfort, therefore, when the vehicle is close to stationary suction should, as far as possible, no longer occur, or only with a small stroke. At low road surface coefficients of friction, on the other hand, that is to say at low vehicle deceleration, it may happen that a high volumetric requirement still exists even at low residual speeds, since the residual control from 20 km/h, for example, to a standstill may still take several seconds. In addition, whilst coefficients of friction are currently low a considerable increase in the coefficient of friction may supervene, which then necessitates a continuous increase in pressure, that is to say advancing of the piston 3 (if possible without maintaining pressure for a long time). Therefore, with low coefficients of friction and low vehicle deceleration, for example, at least the lower threshold 113 is set lower, in order that the earliest possible suction will ensure that there is always a sufficient control volume in the pressure chamber 4. In addition, the piston is then always where possible run back into the starting position 111, that is to say with the maximum stroke.

According to another exemplary embodiment at least the threshold 113 is also reduced if it is anticipated that the vehicle will soon come to a standstill on a roadway with a large gradient. To hold the vehicle on a steep incline a lot of pressure is needed, that is say also a large reserve volume. If a suction cycle were to be initiated at low wheel pressures whilst stationary, the vehicle could accidentally roll away during the suction period of 100 to 200 ms.

In the case of vehicles having a facility for measuring the degree of gradient (for example by means of a longitudinal acceleration sensor), the threshold 113 is therefore reduced, for example, despite lower residual speeds as the incline increases. In the case of a small incline, renewed suction shortly prior to stopping may be suppressed through an increase in the threshold 113.

The method is preferably performed for controlling an active hydraulic braking system comprising an electric motor-driven piston, which in a cylinder generates a central pre-pressure for the wheel brakes of a motor vehicle, an inlet valve for each wheel brake, which serves to isolate the wheel hydraulically from the pre-pressure chamber, an outlet valve for each wheel brake circuit, which serves to discharge brake fluid from the associated wheel brake into a fluid reservoir for the purpose of building up pressure, and a valve-controlled hydraulic connecting line between the reservoir and the cylinder of the piston.

A suitable pre-pressure is preferably determined on the basis of the brake control functions active at any given time and this pressure is set through a positioning of the piston, the position of the piston reached at any given time being compared with at least one threshold value. When at least the one threshold value is exceeded, a suction cycle is initiated, in which the piston is traversed by a dynamically calculated amount of travel in the direction of its rest position, so that brake fluid, which is needed for further control, is sucked back out of the reservoir into the cylinder.

The pre-pressure $P_{Pre\_pressure}$ set by the piston is defined as the maximum for all pressure requests for the n wheels of the vehicle. It is especially preferred if the pre-pressure is determined in accordance with the following:

$$P_{Pre\_Pressure} = \text{maximum}(P_{Request\_1}, \ldots, P_{Request\_n})$$

where $P_{Request\_i}$ defines the pressure request for the i-th wheel, the individual-wheel pressure request $P_{Request\_i}$ for the i-th wheel being determined on the basis of $$P_{Request\_i} = \text{minimum}((P_{ABS\_act\_i} + \Delta P), (\text{maximum}(P_{Request\_Driver\_i}, P_{Request\_Assist\_i}, P_{Request\_TCS\_i}, P_{Request\_ESP\_i}))$$

where $P_{Request\_Driver\_i}$ is the pressure requested by the driver,
$P_{Request\_Assist\_i}$ is the highest pressure request based on active assist functions,
$P_{Request\_TCS\_i}$ is the pressure request by the traction control function,
$P_{Request\_ESP\_i}$ is the pressure request by the dynamic stability control function,
$P_{ABS\_act\_i}$ is the locking pressure level of the wheel during antilock braking control, and
$\Delta P$ is an additional amount of pressure.

According to a development of the invention at least the one, in particular all, position thresholds for the piston, which initiate the suction cycle, is calculated as a function of the instantaneous speed of travel of the vehicle.

The position threshold(s) for the piston, which initiate the suction cycle, is/are advantageously calculated as a function of the pressure level attained by the wheel brakes of the vehicle.

The position threshold(s) for the piston, which initiate the suction cycle, is/are preferably calculated as a function of a detected road incline.

According to a preferred development of the invention a suction cycle is only initiated when the piston has exceeded a lower position threshold and the suction cycle is permitted by virtue of the brake control state on the wheels.

A suction cycle is preferably initiated in any event if the piston has exceeded a high (second) position threshold.

The amount of travel by which the piston is traversed in the event of an active suction cycle is preferably determined as a function of the instantaneous speed of travel of the vehicle.

Alternatively or in addition, the amount of travel by which the piston is traversed in the event of an active suction cycle is preferably calculated as a function of the pressure level attained by the wheel brake(s) of the vehicle.

Alternatively or in addition, the amount of travel by which the piston is traversed in the event of an active suction cycle is advantageously calculated as a function of a detected road incline.

In regard to the control method for setting the required pre-pressure or booster pressure, the individual-wheel control (via inlet and outlet valve) of the multiple wheel brakes, as described above, means that a constantly changing controlled system exists for the booster pressure control. The volumetric intake and thereby the stiffness of the overall braking system varies according to how many inlet valves 6 have just been opened. If the pressure in one wheel brake 9 or multiple wheel brakes is less than the pressure set in the pressure chamber 4, and if the inlet valve 6 assigned to the wheel brake 9 is then opened in order to build up brake pressure, the additional volumetric requirement now existing leads to a reduction of the booster pressure, which has to be compensated for by a corresponding adjusting movement of the piston 3. With regard to the pressure regulator in question, the method described above for the build-up or reduction of pressure on individual wheels via the pair of valves 6, 7 therefore leads to a sometimes very significant source of disturbance.

Figure 3:
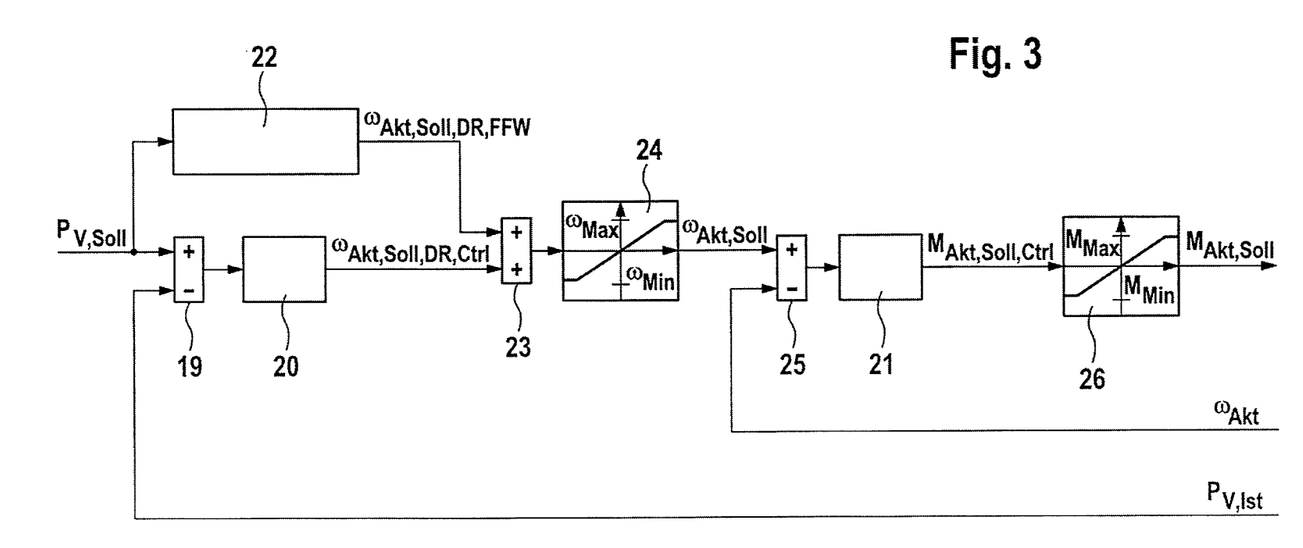
FIG. 3 shows a block diagram of a first exemplary embodiment of a closed-loop control circuit according to the invention.
Figure 4:
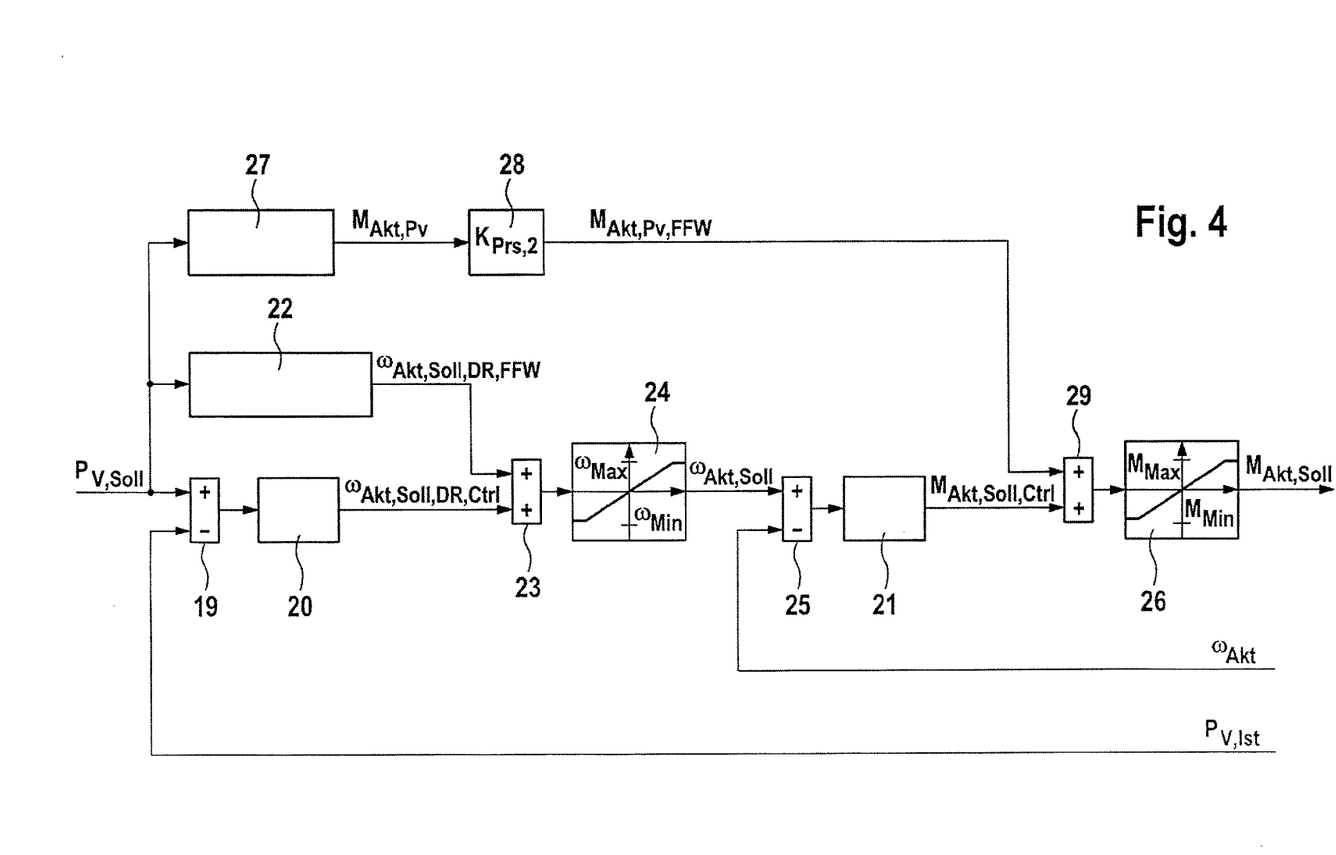
FIG. 4 shows a block diagram of a second exemplary embodiment of a closed-loop control circuit according to the invention.
Figure 5:
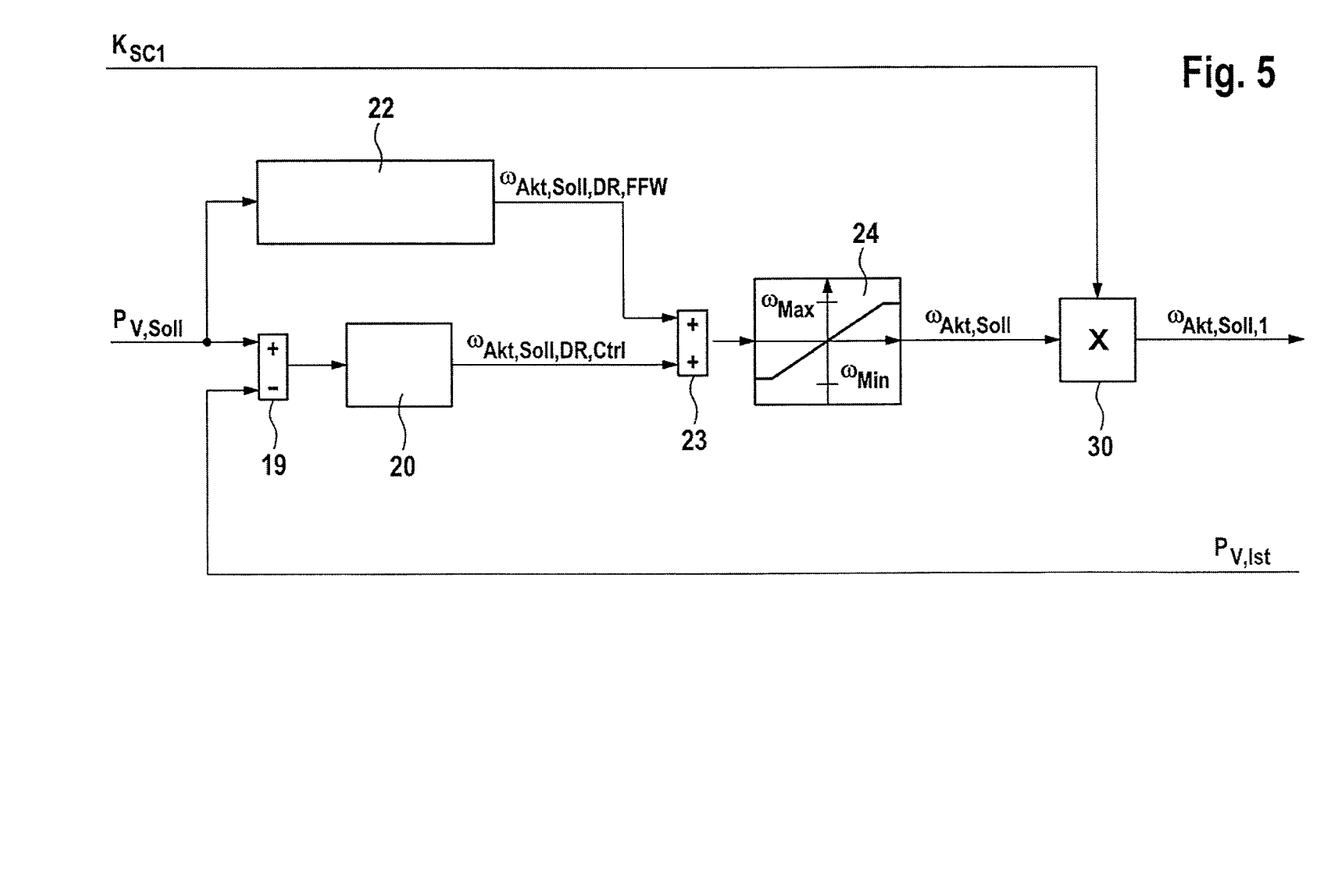
FIG. 5 shows a block diagram of a third exemplary embodiment of a closed-loop control circuit according to the invention.

An exemplary embodiment of a first regulator for setting a required pre-pressure or pre-pressure characteristic curve is represented in FIG. 3 in the form of a block diagram. Further exemplary embodiments of closed-loop control circuits according to the invention are represented in FIGS. 4 and 5.

The regulator is a pressure regulator 20, for example, to which an actuator rotational speed regulator 21 is subordinated with the interposition of other circuit elements 23-25. Here the result of a subtraction performed in a subtraction element 19, or the difference $\Delta Pv$ between the required pressure set value $P_{V,Soll}$ and the pressure actual value $P_{V,Ist}$ currently prevailing is fed to the pressure regulator 20. The output variable of the pressure regulator 20 is the set value for the actuator rotational speed $\omega_{Akt,Soll,DR,Crl}$ that is transmitted to the speed regulator 21 as input variable, taking into account the preset minimum and maximum actuator rotational speeds $\omega_{Min}, \omega_{Max}$. The pressure set value $P_{V,Soll}$ is obtained from the requests described in the preceding sections and corresponds to the set value $P_{Pre\_Pressure}$ already described in detail. The pressure actual value $P_{V,Ist}$ corresponds to the pressure value generated in the pressure chamber 4 of the pressurization device 50 shown in FIG. 1. A proportionally acting regulator (P-regulator) is sufficient as regulator transmission characteristic in the event that no wheel-selective control interventions occur. In order to increase the pressure regulator dynamics, two pilot control functions can be implemented, for example: a speed pilot control (22, see FIG. 3) and an actuator torque pilot control (27, as is additionally represented in FIG. 4).

From the pressure set value $P_{V,Soll}$ a speed pilot control calculation module 22 calculates, by differentiation, an actuator rotational speed set value which, weighted with a boost factor, superimposes an additional component $\omega_{Akt,Soll,DR,FFW}$ on the actuator rotational speed set value of the pressure regulator 20 $\omega_{Akt,Soll,DR,Ctrl}$. The two set speed components are added together in an adder 23 and are fed to a limiting function 24 for limiting to the minimum or maximum admissible set speed ($\omega_{Min}$, $\omega_{Max}$).

In a further subtraction element 25 the limited actuator rotational speed set value $\omega_{Akt,Soll}$ is compared with the actuator rotational speed actual value $\omega_{Akt}$ in order to form an actuator rotational speed set value difference $\Delta\omega_{Soll}$. The actuator speed set value difference $\Delta\omega_{Soll}$ is fed as input variable to the aforementioned speed regulator 21, the output variable of which corresponds to a set value $M_{Akt,Soll,Ctrl}$ of the torque applied by the actuator. The torque set value $M_{Akt,Soll,Ctrl}$ is finally limited in a second limiting module 26 to the minimum or maximum admissible torque value $M_{Akt,Soll}$. It should be noted that the superscript "sol" herein refers to a nominal or target point and "ist" refers to an actual value.

The closed-loop control circuit shown in FIG. 4 largely corresponds to the exemplary embodiment represented in FIG. 3. It can be seen from FIG. 4, however, that a further signal path, which is formed by a pilot control torque calculation module 27 and a scaling element 28 connected to the pilot control torque calculation module 27 on the output side, is connected in parallel with the pressure regulator 20 and the speed pilot control calculation module 22.

The second pilot control component comprises the calculation and direct setting of the actuator torque $M_{Akt,PV}$ corresponding to the pressure set value $P_{V,Soll}$, it being possible to define, by means of the scaling element 28 and its amplification factor $K_{Prs,2}$ ($0 \leq K_{Prs,2} \leq 1$), how strong the weighting of this pilot control is. In a second adder 29 the scaled signal $M_{Akt,PV,FFW}$ mentioned is added to the output signal $M_{Akt,Soll,Ctrl}$ of the speed regulator 21, whilst the result of the addition is fed to a limiting function, which in this context is provided with the reference numeral 26'. The purpose of the limiting function 26', however, corresponds to the limiting function 26 explained in the context and need not be explained.

The function of the speed regulator 21, which usually has a proportional-integrating (PI-) characteristic, is to adjust the required actuator rotational speed set value $\omega_{Akt,Soll}$ as rapidly and accurately as possible and to compensate for the load moments acting on the motor, which here are caused substantially by the booster pressure $P_{V,Ist}$ set in the pressure chamber 4. The torque pilot control described and represented in FIG. 4 here acts in support, since in this case the load moment is largely pilot-controlled by the variable $M_{Akt,PV,FFW}$ and not by the integral component of the speed regulator.

A further exemplary embodiment is represented in FIG. 5. The block diagram represented in FIG. 5 finally shows a modified partial representation of the closed-loop control circuit according to FIG. 3, the same circuit elements being provided with the same reference numerals. In the embodiment represented in FIG. 5, however, scaling is performed on the output variable of the limiting module 24, which corresponds to the limited set value $\omega_{Akt,Soll}$ of the actuator rotational speed, using the scaling factor $K_{SC1}$, the scaling being performed in the multiplication element 30. The scaled actuator rotational speed set value $\omega_{Akt,Soll,1}$ is again fed to the subtraction element 25 (see FIG. 3) for further processing. To take account of the problems described and inherent in the continually changing controlled system as a result of the variable number of wheel brakes 9 hydraulically connected to the pressure chamber 4, in the event that pressure is built up or reduced on individual wheels, it is proposed, for example, that in this event the resulting correcting variable of the pressure regulator 20, the set speed $\omega_{Akt,Soll}$, be reduced by a corresponding scaling factor $K_{SC1}$:

$$\omega_{Akt,Soll,1} = K_{SC1} * \omega_{Akt,Soll}.$$

The scaling factor $K_{SC1}$ is advantageously defined as:

$$K_{SC1} = \text{minimum}(1, K_{SC1,ABS}, K_{SC1,TCS}, \ldots, K_{SC1,ESP}).$$

The scaling factor $K_{SC1}$ is therefore obtained as the smallest value of all individual scaling factors. Taking this factor into account affords a more careful intervention of the booster pressure regulator compared to the normal braking function, in which all wheel brakes 9 are hydraulically connected to the pressure chamber 4 (scaling factor $K_{SC1}=1$), since the set rotational speed is scaled down accordingly and therefore does not intervene as strongly in the closed loop. The magnitude of the scaling factor and hence also the intensity of the reduction of the unscaled pressure regulator correcting variable $\omega_{Akt,Soll}$ depends on which brake control or assist function is active.

In a further exemplary embodiment this factor can additionally also be made to vary as a function of the number of wheel brakes 9 hydraulically connected to the pressure chamber 4.

The definition of the individual scaling factors will here be set forth taking the factor $K_{SC1,ABS}$ as an example. This then applies analogosly to the other brake control functions or assist functions described at the outset.

It is calculated, for example, that:
$K_{SC1,ABS} = K_{ABS}$, if the ABS control is active, and
$K_{SC1,ABS} = 1$, otherwise.
For the parameter $K_{ABS}$: $0 < K_{ABS} \leq 1$.

In a normal braking function, in which the driver requests a brake pressure by actuating the pedal, or in the case of an assist function, which requests a central brake pressure for all wheel brakes, the scaling factor $K_{SC1}=1$. If no control functions are active on individual wheels, the resulting scaling factor $K_{SC1}$ therefore retains the value 1 and the set rotational speed as correcting variable of the pressure regulator is delivered to the subordinate motor speed control unchanged. The pressure regulator has maximum use of the regulator and actuator dynamics. On the other hand, should pressure be reduced or built up in one or more individual wheel brakes 9, the method described avoids the occurrence of excessive pressure oscillations in the pressure chamber 4 due to an excessive boost factor and hence excessive correcting variables by the booster pressure regulator.

Whilst for normal braking functions and most of the assist functions a central brake pressure or brake pressure characteristic is requested, which although it should be very rapidly feasible should nevertheless be comfortably and precisely proportionable, the primary focus in order to increase the driving stability in the case of a brake control function on individual wheels is the dynamics and the retention of the preset pre-pressure irrespective of the source of disturbance caused by the valve actions.

In order to deal with the aforementioned significant source of disturbance of the booster pressure regulator in question, occasioned by the need for a build-up and reduction of pressure on individual wheels via the pair of valves 6, 7, it is further proposed, for example, to cater for this eventuality by extending the structure of the booster pressure regulator (usually designed according to comfort and proportionability criteria) and modifying the regulator parameters. Through this modification, the boost pressure control is better able to moderate the sources of disturbance in the closed-loop pressure control circuit occasioned by the brake control function on individual wheels and the valve actions, as occurs to a significant degree, particularly in the ABS function.

For this purpose, in the event that the ABS function is active and undertakes pressure control on individual wheels, the booster pressure regulator, which in its basic structure has a P-characteristic, is expanded by a differentiating (D-) component, so that the sources of disturbance can be counteracted more rapidly with a corresponding correcting variable.

To assist the pressure regulator in the ABS control mode, it is further proposed, for example, to cater for this eventuality by likewise modifying the parameters of the rotational speed regulator, with a view to improved guidance behavior.

While the above description constitutes the preferred embodiment of the present invention, it will be appreciated that the invention is susceptible to modification, variation, and change without departing from the proper scope and fair meaning of the accompanying claims.

The invention claimed is:

1. A method for controlling an electro-hydraulic braking system for motor vehicles, comprising providing at least one first closed or open-loop brake pressure control function including an antilock control function, and a second closed or open-loop brake pressure control function, which can be activated in a "brake-by-wire" operating mode, and providing a pressurization device (50), which can be activated by means of an electronic control unit and which is or can be connected to hydraulically actuated wheel brakes (9) and by means of which the wheel brakes (9) can be hydraulically actuated by way of at least one pressure regulating valve (6), wherein the pressurization device is provided in a form having a cylinder-piston arrangement having a hydraulic pressure chamber (4), the piston (3) of which arrangement can be displaced relative to a rest position (15, 111) by an electromechanical actuator (1, 2), determining a set pressure value ($P_{Request\_i}$) for each wheel brake (9), activating the cylinder-piston arrangement (3, 4) in such a way that a predetermined pre-pressure ($P_{Pre\_Pressure}$), which is determined from the set pressure values ($P_{Request\_i}$), is set in the hydraulic pressure chamber (4) by displacement (s) of the piston (3), and selecting the pre-pressure ($P_{Pre\_Pressure}$) as the largest of the set pressure values ($P_{Request\_i}$).

2. The method as claimed in claim 1 further comprising comparing the actual displacement or position (14) of the piston (3) with at least one predetermined position threshold value (17, 113; 18, 120) and that the piston (3) is displaced by a predetermined amount of travel, in the direction of the rest position (15, 111) if the actual displacement or position (14) of the piston (3) exceeds the predetermined position threshold value (17, 113; 18, 120), so that brake fluid flows out of a brake fluid reservoir (11) into the hydraulic pressure chamber (4).

3. The method as claimed in claim 2, further comprising during the displacement of the piston (3) in the direction of the rest position, hydraulically isolating the wheel brakes (9) from the hydraulic pressure chamber (4) by means of an electrically controllable inlet valve (6).

4. The method as claimed in claim 2 further comprising determining the position threshold value (17, 113; 18, 120) as a function of a vehicle speed or a pressure value attained by the wheel brakes or a road incline 5. The method as claimed in claim 2 further comprising the displacement of the piston (3) in the direction of the rest position is always performed if the actual displacement or position (14) of the piston (3) exceeds a second position threshold value, the second position threshold value being greater than the first position threshold value.

6. The method as claimed in claim 2 further comprising the amount of travel is determined as a function of a vehicle speed or a pressure value attained by the wheel brakes or a road incline.

7. The method as claimed in claim 1 further comprising determining the set pressure value ($P_{Request\_i}$) for a wheel brake (i) from a braking request of a driver, at least one braking request of the second active closed or open-loop brake pressure control function for the wheel brake (i) and a braking request, which is determined on the basis of information on the state of the antilock control function on the wheel brake (i).

8. The method as claimed in claim 7 further comprising determining the braking request on the basis of the information on the state of the antilock control on the wheel brake (i) by addition from a preset amount of pressure ($\Delta P$) and a wheel-specific pressure value of the antilock control, which results in a locking of the wheel brake (i), if the antilock control function on the wheel brake (i) actively determines the set pressure value ($P_{Request\_i}$).

9. The method as claimed in claim 7 further comprising the braking request, which is determined on the basis of the information on the state of the antilock control on the wheel brake (i), is determined by addition from a preset amount of pressure ($\Delta P$) and a preset maximum pressure, if the antilock control function on the wheel brake (i) is inactive or does not determine the set pressure value ($P_{Request\_i}$).

10. The method as claimed in claim 1 further comprising wherein a pre-pressure actual value ($P_{V,Ist}$) and an actuator speed actual value ($\omega_{Akt}$) are detected, a pre-pressure set value ($P_{V,Soll}$, $P_{Pre\_Pressure}$) is determined the predetermined pre-pressure set value ($P_{V,Soll}$, $P_{Pre\_Pressure}$) and a pre-pressure actual value ($P_{V,Ist}$) are fed as input variables to a regulator device, provided in the form of a pressure regulator (20) and a speed regulator (21) connected to the pressure regulator on the output side, wherein the pressure regulator (20) delivers an actuator speed set value ($\omega_{Akt,Soll,DR,Ctrl}$) and an actuator speed set value ($\omega_{Akt,Soll}$) and the actuator speed actual value ($\omega_{Akt}$) are fed to the speed regulator (21) as input variables.

11. The method as claimed in claim 10 further comprising the pressure regulator (20) delivering a first actuator speed set value ($\omega_{Akt,Soll,DR,Ctrl}$), determining a second actuator speed set value ($\omega_{Akt,Soll,DR,FFW}$) from the pre-pressure set value ($P_{V,Soll}$, or $P_{Pre\_Pressure}$) and the input actuator speed set value ($\omega_{Akt,Soll}$) for the speed regulator is determined on the basis of the first and the second actuator speed set values ($\omega_{Akt,Soll,DR,Ctrl}$, $\omega_{Akt,Soll,DR,FFW}$).

12. The method as claimed in claim 11 further comprising the first and the second actuator speed or actuator rotational speed set values ($\omega_{Akt,Soll,DR,\ Ctrl}$, $\omega_{Akt,\ Soll,\ DR,\ FFW}$), are evaluated.

13. The method as claimed in claim 10 further comprising the actuator speed or actuator rotational speed set value ($\omega_{Akt,Soll}$) fed to the speed regulator (21) is reduced, as a function of the activated open or closed-loop brake pressure control function (ABS, TCS, ESP), which correspond to an individual-wheel control, or as a function of the number of wheel brakes (9), which are connected to the hydraulic pressure chamber (4), by multiplying the actuator speed or actuator rotational speed set value ($\omega_{Akt,Soll}$) by a scaling factor ($K_{SC1}$).

14. The method as claimed in claim 13 further comprising the scaling factor ($K_{SC1}$) is obtained as the lowest of the individual scaling factors ($K_{SC1,ABS}$, $K_{SC1,TCS}$, $K_{SC1,ESP}$) of the closed or open-loop brake pressure control functions.

15. The method as claimed in claim 14 further comprising the individual scaling factor ($K_{SC1,ABS}$,) of each, closed or open-loop brake pressure control function, which corresponds to an individual-wheel control, is selected as a preset value ($K_{ABS}$) greater than zero and less than or equal to one, when the corresponding closed or open-loop brake pressure control function (ABS) is active, and is selected as one, when the corresponding closed or open-loop brake pressure control function (ABS) is inactive.

16. The method as claimed in claim 10 further comprising the speed regulator (21) delivers an actuator torque set value ($M_{Akt,Soll,Ctrl}$), an actuator torque ($M_{Akt,PV}$) corresponding to the pre-pressure set value ($P_{V,Soll}$) is determined and an actuator torque set value ($M_{Akt,Soll}$) for activating the actuator (1, 2) is determined from the actuator torque set value of the speed regulator ($M_{Akt,Soll,Ctrl}$) and the actuator torque ($M_{Akt,PV}$) corresponding to the pre-pressure set value by weighted addition ($K_{Prs,2}$) or taking into account preset minimum and maximum torque limit values ($M_{Min,MMax}$).

17. A method for controlling an electro-hydraulic braking system for motor vehicles, comprising providing at least one first closed or open-loop brake pressure control function including an antilock control function, and a second closed or open-loop brake pressure control function, which can be activated in a "brake-by-wire" operating mode, and providing a pressurization device (50), which can be activated by means of an electronic control unit and which is or can be connected to hydraulically actuated wheel brakes (9) and by means of which the wheel brakes (9) can be hydraulically actuated by way of at least one pressure regulating valve (6), wherein the pressurization device is provided in a form having a cylinder-piston arrangement having a hydraulic pressure chamber (4), the piston (3) of which arrangement can be displaced relative to a rest position (15, 111) by an electromechanical actuator (1, 2) determining a set pressure value ($P_{Request\_i}$) for each wheel brake (9), activating the cylinder-piston arrangement (3, 4) in such a way that a predetermined pre-pressure ($P_{Pre\_Pressure}$), which is determined from the set pressure values ($P_{Request\_i}$), is set in the hydraulic pressure chamber (4) by displacement(s) of the piston (3), and comparing the actual displacement or position (14) of the piston (3) with at least one predetermined position threshold value (17, 113; 18, 120) and that the piston (3) is displaced by a predetermined amount of travel, in the direction of the rest position (15, 111) if the actual displacement or position (14) of the piston (3) exceeds the predetermined position threshold value (17, 113; 18, 120), so that brake fluid flows out of a brake fluid reservoir (11) into the hydraulic pressure chamber (4);

wherein the displacement of the piston (3) in the direction of the rest position is performed if the actual displacement or position (14) of the piston (3) exceeds a first position threshold value and a further condition is simultaneously fulfilled.

18. A device for controlling an electro-hydraulic braking system for motor vehicles, comprising at least one closed or open-loop brake pressure control function, which can be activated in a "brake-by-wire" operating mode, a pressurization device (50), which can be activated by means of an electronic control unit and which is or can be connected to hydraulically actuated wheel brakes (9) and by means of which the wheel brakes (9) can be hydraulically actuated, wherein the pressurization device in the form having a cylinder-piston arrangement having a hydraulic pressure chamber (4), a piston (3) of the cylinder piston arrangement can be displaced by an electromechanical actuator (1, 2), so that a pre-pressure set value ($P_{V,Soll,PPre\_Pressure}$) can be set in the hydraulic chamber (4), a means for detecting a pre-pressure actual value ($P_{V,Ist}$), a means for detecting an actuator speed or actuator rotational speed actual value ($\omega_{Akt}$), a means for determining the pre-pressure set value ($P_{V,Soll}$, $P_{Pre\_Pressure}$) a closed-loop control circuit having a pressure regulator (20) and a speed or actuator rotational speed regulator (21) connected to the pressure regulator (20) on the output side, wherein the pre-pressure set value ($P_{V,Soll}$, $P_{Pre\_Pressure}$) and the pre-pressure actual value ($P_{V,Ist}$) are fed as input variables to the closed-loop control circuit, the pressure regulator (20) delivers an actuator speed or actuator rotational speed set value ($\omega_{Akt,Soll,DR,Ctrl}$), and an actuator speed or actuator rotational speed set value ($\omega_{Akt,Soll}$) and the actuator speed or actuator rotational speed actual value ($\omega_{Akt}$) are fed to the actuator speed or actuator rotational speed regulator (21) as input variables.

19. A device, particularly as claimed in claim 18, further comprising an electronic control unit configured to perform the following method steps, activating the cylinder-piston arrangement (3, 4) in such a way that a predetermined pre-pressure ($P_{Pre\_Pressure}$), which is determined from the set pressure values ($P_{Request\_i}$), is set in the hydraulic pressure chamber (4) by displacements (s) of the piston (3).

* * * * *